United States Patent [19]

Nagasaki et al.

[11] 4,344,337

[45] Aug. 17, 1982

[54] REDUCTION AND REVERSING GEAR FOR MARINE PROPULSION SYSTEMS

[75] Inventors: Michisuke Nagasaki, Toyonaka; Kinichi Aso, Yao, both of Japan

[73] Assignee: Yanmar Diesel Engine Co., Ltd., Osaka, Japan

[21] Appl. No.: 93,812

[22] Filed: Nov. 13, 1979

[51] Int. Cl.³ .................... F16H 37/00; F16H 3/44; F16H 57/10

[52] U.S. Cl. .................... 74/740; 74/319; 74/322; 74/333; 74/404; 74/784; 74/788

[58] Field of Search ............... 74/318, 319, 322, 361, 74/376, 377, 323, 324, 333, 355, 404, 788, 784, 740

[56] References Cited

U.S. PATENT DOCUMENTS

| | | | |
|---|---|---|---|
| 1,836,298 | 12/1931 | Winther | 74/788 |
| 2,370,484 | 2/1945 | Nabstedt | 74/784 |
| 2,775,328 | 12/1956 | Yokel | 74/364 |
| 2,990,726 | 7/1961 | McDonald | 74/740 |
| 3,217,564 | 11/1965 | Smith | 74/788 X |
| 3,570,319 | 3/1971 | Arnold | 74/361 |
| 3,695,401 | 10/1972 | Nagasaki | 74/377 |
| 3,803,934 | 4/1974 | Yokel | 74/361 |
| 3,922,997 | 12/1975 | Jameson | 74/377 X |
| 3,952,606 | 4/1976 | Schulz | 74/377 |
| 4,010,653 | 3/1977 | Mekjian | 74/781 R |
| 4,059,029 | 11/1977 | Cawi | 74/785 |
| 4,138,006 | 2/1979 | Benson, Jr. | 74/377 X |

FOREIGN PATENT DOCUMENTS

| 2702458 | 7/1977 | Fed. Rep. of Germany | 74/785 |
|---|---|---|---|
| 6455 | of 1914 | United Kingdom | 74/377 |

Primary Examiner—Leslie Braun
Attorney, Agent, or Firm—Norbert P. Holler

[57] ABSTRACT

A reduction and reversing gear for marine propulsion systems making use of the clutch case of a conventional reduction and reversing gear of a type having an input shaft mounted on an upper part of the clutch case, an output shaft extending in parallel with the input shaft and mounted on a lower part of the clutch case, a multiple disc clutch carried by the input shaft, a small gear rotatably carried by the input shaft and adapted to be connected to and disconnected from the latter by the multiple disc clutch, and a large gear carried by the output shaft and engaging the small gear. A planetary gear type reduction gear is disposed in the space around the output shaft and below the multiple disc clutch to make an efficient use of that space, thereby to provide an additional reduction stage between the large gear and the output shaft. Thanks to this additional reduction stage provided by the planetary gear type reduction gear, it is possible to obtain a large variety of reduction ratios up to 8 using the same clutch case.

5 Claims, 11 Drawing Figures

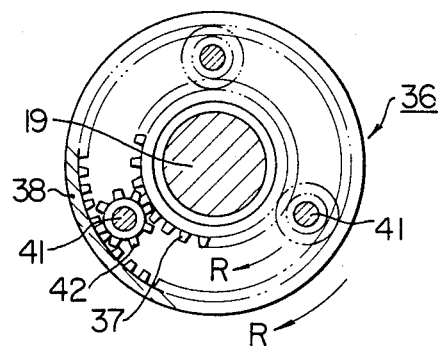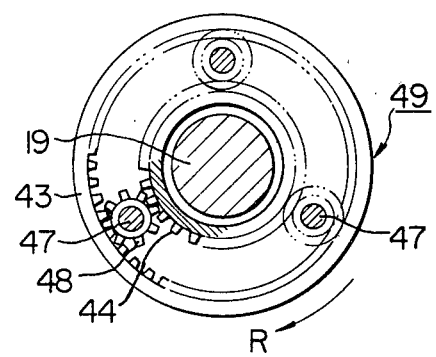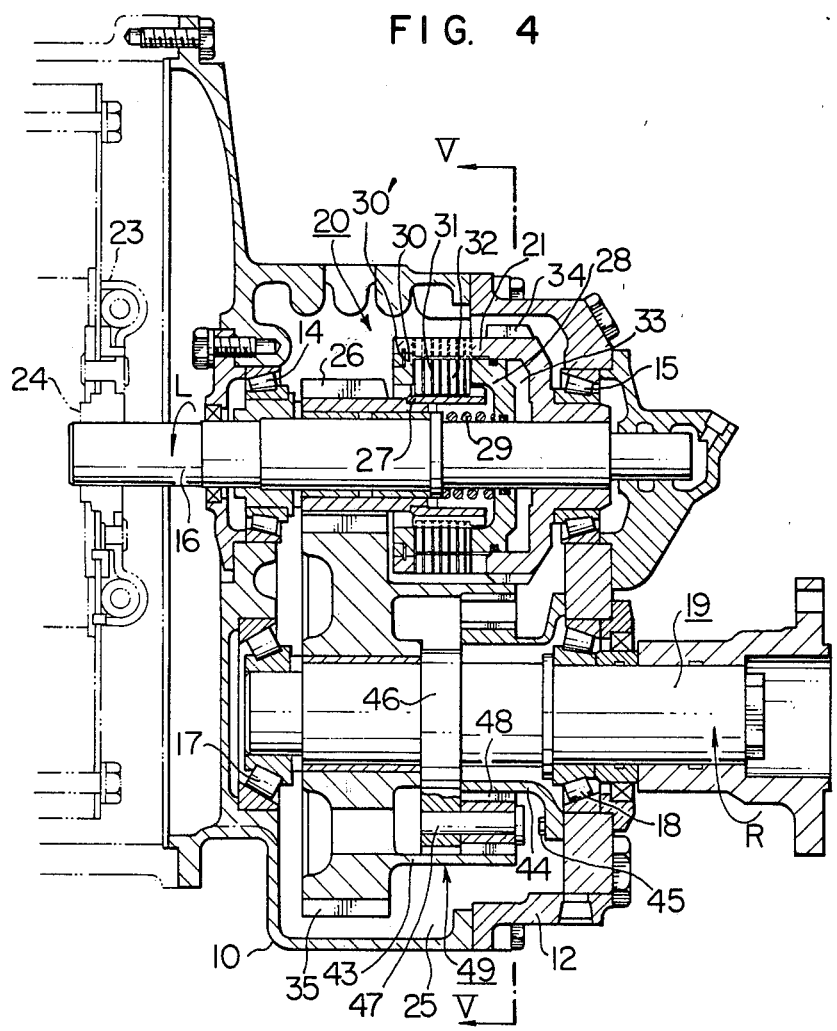

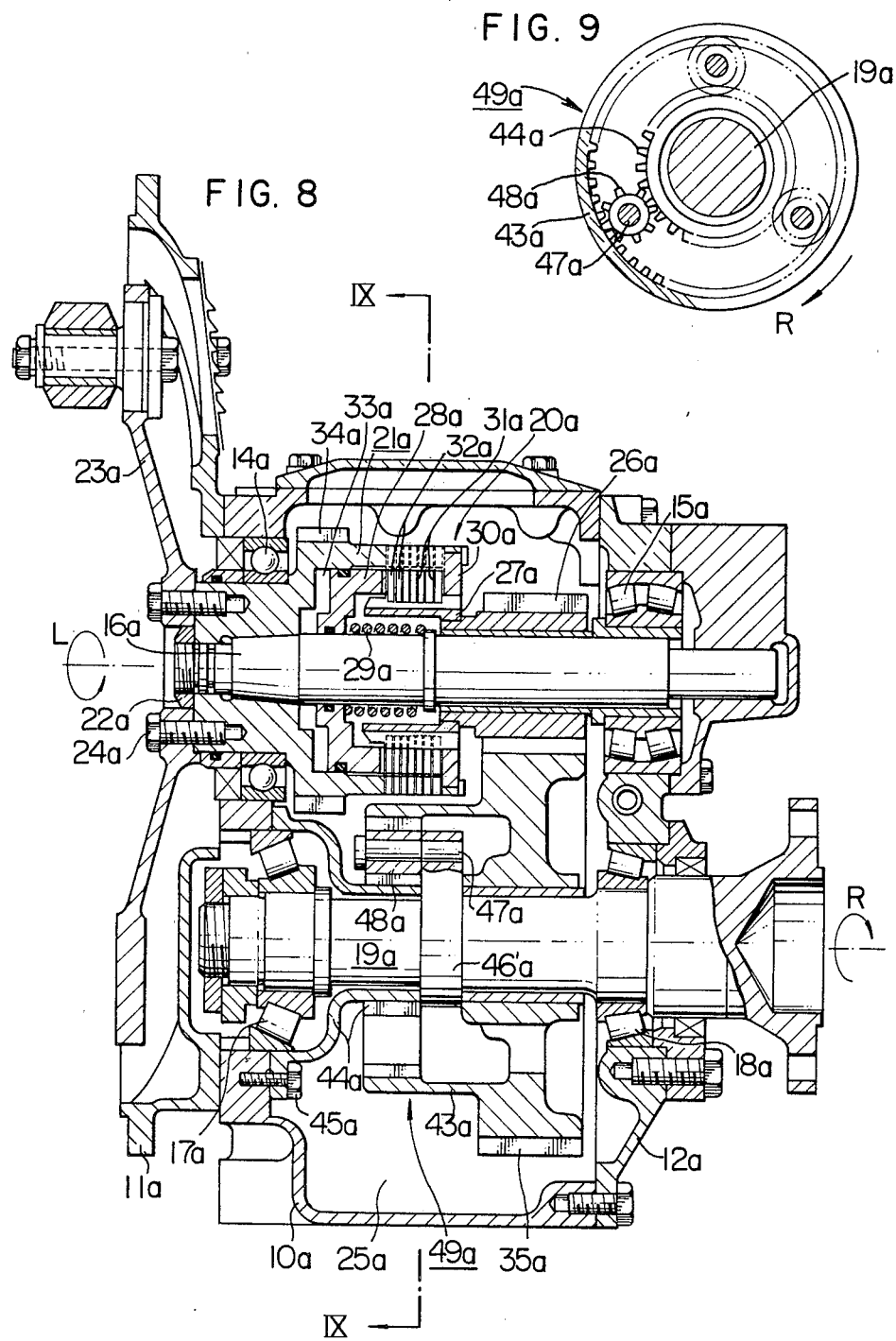

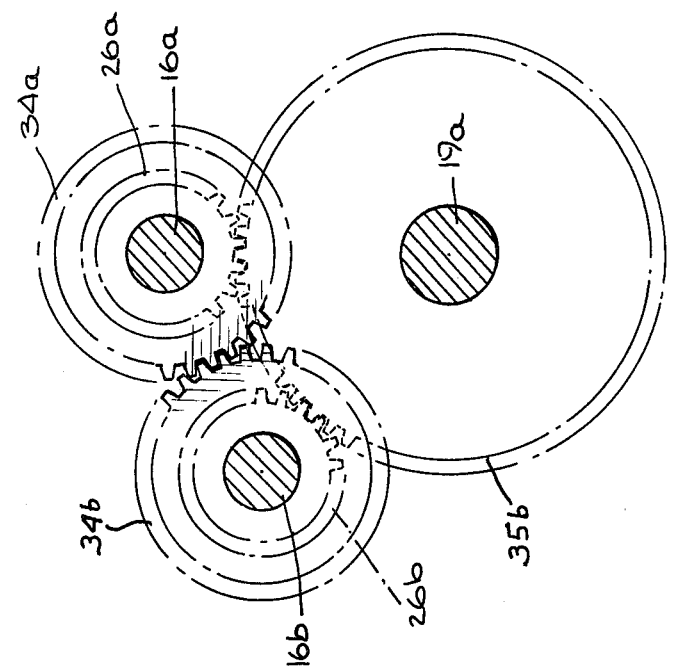
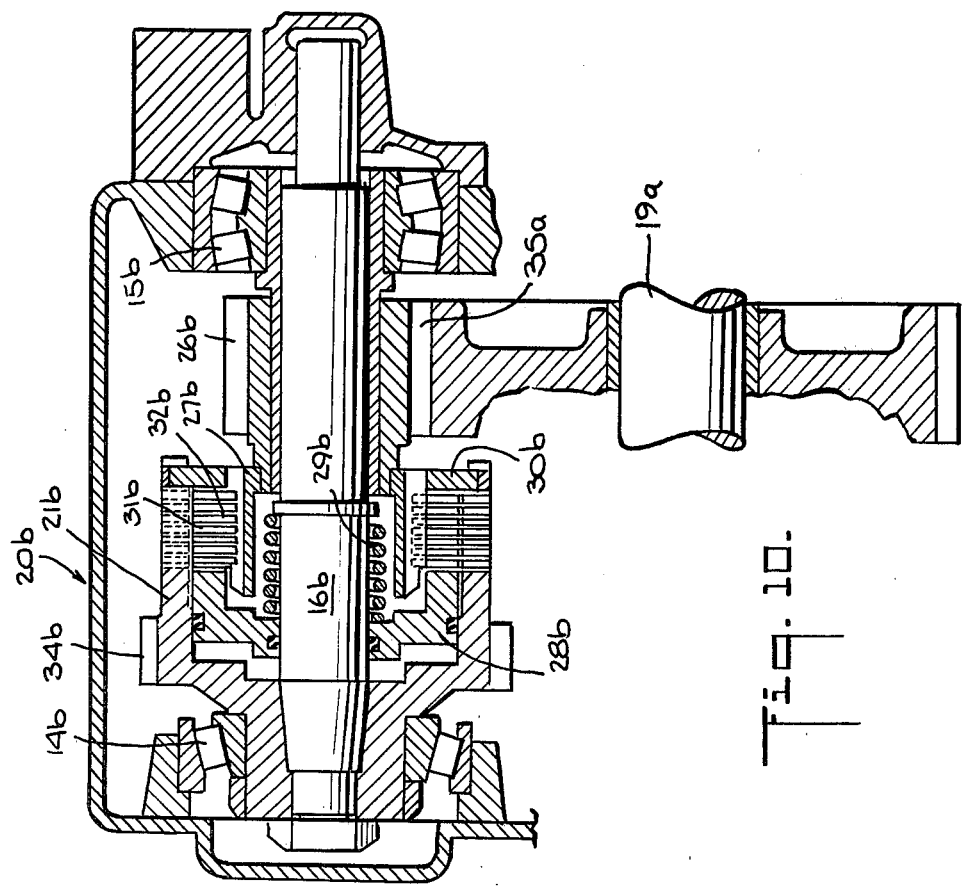

REDUCTION AND REVERSING GEAR FOR MARINE PROPULSION SYSTEMS

BACKGROUND OF THE INVENTION

The present invention broadly relates to marine propulsion systems and, more particularly, to a reduction and reversing gear for propulsion systems which makes it possible to obtain a large variety of reduction ratio ranging between about 2.0 and 8.0 by making use of a clutch case for small reduction ratio of conventional reduction gear.

Hitherto, various measures have been taken to obtain a large variety of the reduction ratio, the typical examples of which are: (a) to use the clutch case for the large reduction ratio also as the clutch case for the small reduction ratio and (b) to use different clutch cases for various reduction ratios, the clutch cases having different distances between the input and the output shafts.

The first measure (a), however, poses various problems such as raised cost and increased weight, although this measure eliminates the necessity of different clutch cases. In addition, this measure makes it difficult to install the reduction and reversing gear on the hull. Namely, since the clutch case has a large vertical dimension, the lower part inconveniently abuts the bottom of the hull, if the reduction and reversing gear is installed at the stern of the hull. To avoid this, it is necessary to shift the position of the clutch case toward the bow of the hull. Apparently, this requires a large volume of the engine room.

In the method (b) above, the mounting of the engine, as well as the reduction and reversing gear on the hull, is made difficult because the different clutch cases provide different distances between the input and the output shafts. Namely, considerable work is required to modify the hull and the engine bed or the bed for the reduction and reversing gear, to meet the various distances between the input and output shafts of the reduction and reversing gear.

Generally, the reduction and reversing gear for marine propulsion systems has an input shaft disposed at an upper portion of the clutch case and an output shaft disposed at a lower portion of the clutch case in parallel with the input shaft. The input shaft carries a multiple disc clutch, while the output shaft carries a large gear. The large gear engages a small gear which in turn is adapted to be connected to the input shaft through the medium of the clutch.

It is to be noted that this construction of the reduction and reversing gear provides a comparatively large vacant space beneath the clutch and around the output shaft.

Upon recognition of this point, the present invention proposes to make an efficient use of this vacant space, by mounting in this space a planetary gear type reduction gear so that an additional reduction may be achieved between the large gear and the output shaft.

More specifically, according to the invention, there is provided a reduction and reversing gear for marine propulsion systems the reduction and reversing gear having: a clutch case; an input shaft mounted on an upper portion of the clutch case; an output shaft mounted at a lower portion of the clutch case and extending in parallel with the input shaft; an ahead unit including a multiple disc clutch mounted on the input shaft and having a clutch housing adapted to rotate unitarily with the input shaft and a small gear mounted on the input shaft and adjacent to the multiple disc clutch, the small gear being adapted to be connected to and disconnected from the input shaft in accordance with the state of the multiple disc clutch; a large gear mounted on said output shaft for engagement with said small gear; and an astern unit disposed in parallel with said ahead unit and including a multiple disc clutch having a clutch housing operatively connected to the clutch housing of the ahead unit and a small gear for engagement with said large gear; wherein the improvement comprises a planetary gear type reduction gear disposed in the space below the multiple disc clutch of said ahead unit, the planetary gear type reduction gear being connected at its one side to the large gear and to the output shaft at its other side.

Other features and advantages of the invention will become clear from the following description of the preferred embodiment taken in conjunction with the accompanying drawings.

BRIEF DESCRIPTION OF THE DRAWINGS

FIG. 3 is a sectional view of a planetary gear type reduction gear taken along the line III—III of FIG. 2;

FIG. 4 is a sectional view of a second embodiment of the invention;

FIG. 5 is a sectional view of a planetary gear type reduction gear taken along the line V—V of FIG. 4;

FIG. 8 is a sectional view of a fourth embodiment of the invention;

FIG. 9 is a sectional view of a planetary gear type reduction gear taken along the line IX—IX of FIG. 8;

FIG. 10 is a sectional view of an astern unit for the gearing of the fourth embodiment; and FIG. 11 is a diagrammatic illustration of the gears of the ahead and astern units of the fourth embodiment.

DESCRIPTION OF THE PREFERRED EMBODIMENTS

Before turning to the description of the preferred embodiment of the invention, a description will be made as to a typical conventional reduction and reversing gear, in order to clarify the drawback of the prior art and, hence, the advantage of the present invention.

Figure 1:
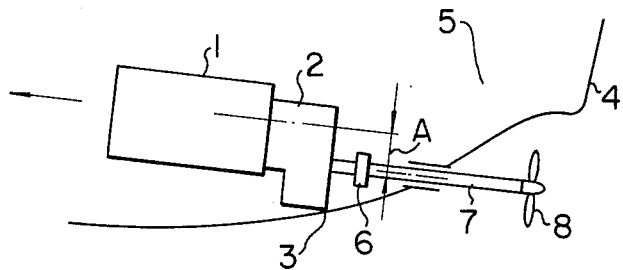
FIG. 1 is an illustration of a conventional reduction and reversing gear in which the clutch case for a reduction gear of a large reduction ratio is used also for a reduction gear of a small reduction ratio.

FIG. 1 shows a typical conventional reduction and reversing gear in which a clutch case for a large reduction ratio is used also for a small reduction ratio. This conventional reduction and reversing gear involves various problems such as raised cost and increased weight, although it eliminates the necessity for a different clutch case. In addition, this reduction and reversing gear is difficult to install on the hull, due to the large vertical dimension of the clutch case. Namely, if this gear is installed on the stern portion of the hull 4, the bottom of the hull 4 is inconveniently contacted by the lower end 3 of the clutch case 2 which has large vertical dimensions. It is, therefore, necessary to shift the position of the clutch case 2 toward the bow of the hull, i.e.

to the left as viewed in FIG. 1, as shown by an arrow. Apparently, this in turn requires a larger space of the engine room 5.

As stated before, it has been proposed to use different clutch cases for different reduction ratios, having different distances A between the input and the output shafts. This measure, however, encounters a difficulty in installation of the engine, due to the variation of the distance A between the input and the output shafts. Namely, considerable work is required for the modification of the hull and the engine bed or the bed for the reduction and reversing gear.

In FIG. 1, the reference numerals 1, 6, 7 and 8 denote, respectively, an engine, a coupling, a propeller shaft and a propeller.

Figure 2:
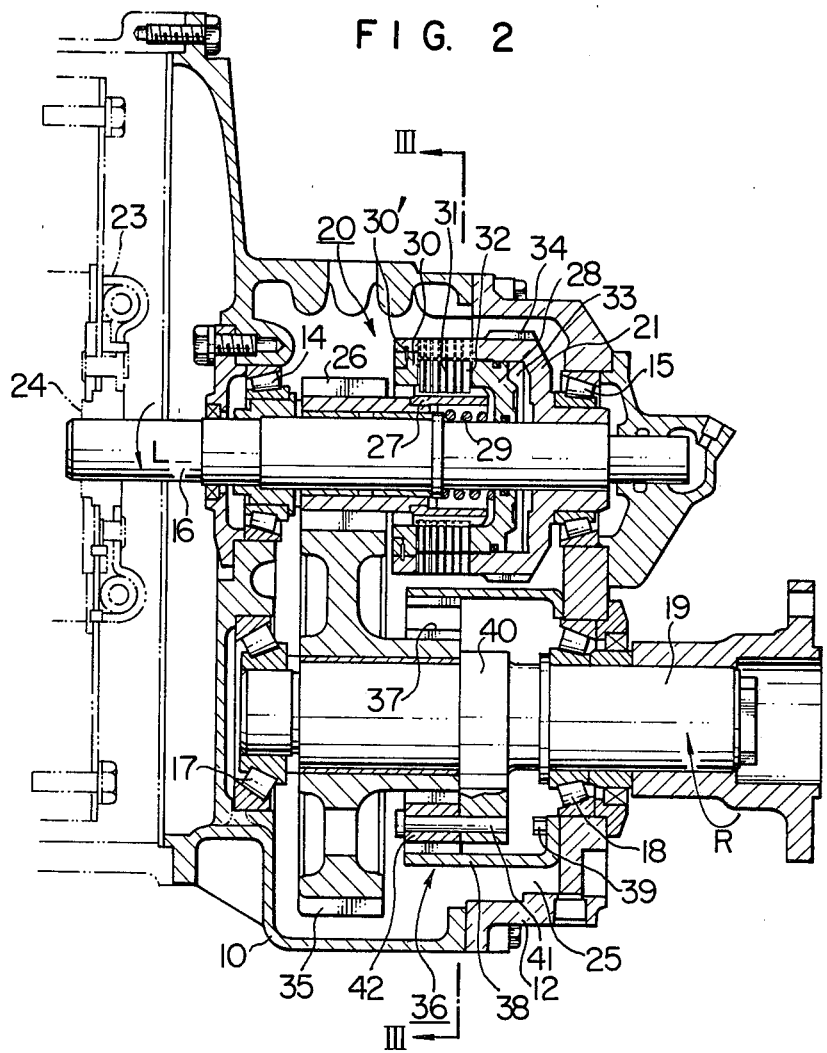
FIG. 2 is a sectional view of a first embodiment of the invention.

FIGS. 2 and 3 show a first embodiment of the invention. Referring first to FIG. 2, the front section 10 of the clutch case is opened at its rear end to which attached is a rear section 12 of the clutch case by means of a plurality of bolts. The rear section 12 of the clutch case is adapted to play also the role of the member for supporting bearings. The clutch case 10, 12 carries at its upper portion an input shaft 16 through the medium of bearings 14 and 15. Also, an output shaft 19 is mounted below the input shaft 16 through the medium of bearings 17, 18 so as to extend in parallel with the input shaft 16.

A reference numeral 20 generally designates a commonly used ahead unit incorporating a wet type multiple disc clutch having a clutch housing 21 which is fitted to the input shaft 16 by a hydraulic pressure.

A reference numeral 23 denotes a torsion damper fixed to the fly-wheel of the engine and provided with a central spline hub 24 splined to the input shaft 16. The input shaft 16 rotatably carries a small gear 26 which has a drum 27 unitary therewith. This drum 27 is disposed in the clutch housing 21 and is provided with a spline on its outer peripheral surface.

An annular piston 28 fitting to the inner surface of the clutch housing 21 and also to the surface of the input shaft 16 is resiliently biased to the right by the force of a compression spring 29. A reference numeral 30 denotes a pressure disc which is fixed to the opened end of the clutch housing 21 by means of a snap ring 30'. A plurality of discs 31 and a plurality of friction discs 32 are disposed alternatingly between the piston 28 and the pressure disc 30. Each of the discs 31 is provided with peripheral teeth or projections which engage the grooves formed in the inner peripheral surface of the clutch housing 21. Thus, the discs 31 are allowed to move relatively to the clutch housing 21 in the axial direction, but are prevented from rotating relatively to the latter. Also, the friction discs 32 have inner peripheral splines which engage the spline of the drum 27 to freely move only in the axial direction.

Therefore, as the hydraulic pressure is introduced into the pressure chamber 33 behind the piston 28, the discs 31 are brought into pressure contact with the friction discs 32 so that the clutch becomes operative to connect the small gear 26 to the housing 21. The described small gear and multiple disc clutch in combination constitute the ahead unit 20.

A reference numeral 34 denotes a gear which is provided on the periphery of the housing 21 and adapted to engage a corresponding gear formed on the outer periphery of the clutch housing of an astern unit (not shown in FIG. 2 but to be more fully described hereinafter in connection with FIGS. 10 and 11). Basically, however, the astern unit has a small gear corresponding to the small gear 26 of the ahead unit and meshing with the large gear 35 together with the small gear 26. Examples of conventional astern units are well known to those skilled in the art, as shown by U.S. Pat. Nos. 2,775,328, 3,570,319 and 3,695,401.

The large gear 35 carried by the output shaft 19 has an externally toothed gear 37 of a small diameter formed unitarily and coaxially therewith. This externally toothed gear 37 is projected into the space 25 below the clutch housing 21 of the ahead unit 20.

To the clutch case section 12, closer to the right end of the externally toothed gear 37 as viewed in the drawing, attached by means of a plurality of bolts 39 is an internally toothed gear 38 of a large diameter which is in alignment and coaxial with the externally toothed gear 37. An outwardly directed flange 40 is provided on the output shaft 19 and is disposed adjacent to the externally toothed gear 37. The flange 40 has three support shafts 41 which are extended in parallel with the output shaft 19 and equi-spaced in the circumferential direction to project into the space between the externally toothed gear 37 and the internally toothed gear 38. Each support shaft 41 supports a planet gear 42 which engages both the externally toothed gear 37 and the internally toothed gear 38, thereby to constitute a planetary gear type reduction gear generally designated by a reference numeral 36 (See FIG. 3).

During the operation of the engine, the input shaft 16 rotates counter-clockwise (in the direction of arrow L) as viewed from the stern side (right side in the drawing). As the clutch of the ahead unit 20 is turned into operative condition, the small gear 26 rotates in the same direction as the input shaft, so that the large gear 35 rotates clockwise (in the direction of arrow R) as viewed from the stern side. The externally toothed small gear 37 is also rotated clockwise (in the direction of arrow R) as shown in FIG. 3, together with the large gear 35. Therefore, the planet gears 42 revolve clockwise along the internally toothed large gear 38 fixed to the clutch case 12, while making counter-clockwise rotation around their own axes. The revolution of the planet gears 42 is transmitted to the output shaft 19 through the support shafts 41 (FIG. 2) and then through the flange 40, so that the output shaft 19 is rotated in the clockwise direction at a reduced speed of rotation.

It is assumed here that three reduction ratios $i_1$, $i_2$, and $i_3$ are obtainable between the small gear 26 and the large gear 35, by changing the number of teeth of the meshing gears 26 and 35, with the clutch case 10, 12 for the small reduction ratio shown in FIG. 2. According to the invention, it is remarkable that, thanks to the provision of the planetary gear type reduction gear 36 having a reduction ratio of $i_4$, it is possible to obtain the six different reduction ratios $i_1$, $i_2$, $i_3$, $i_1 \cdot i_4$, $i_2 \cdot i_4$ and $i_3 \cdot i_4$ with the same clutch case 10, 12. Namely, in addition to the three reduction ratios $i_1$, $i_2$ and $i_3$ which are obtained in the conventional reduction gear in which the large gear 35 is merely fixed to the output shaft 19, three reduction ratios $i_1 \cdot i_4$, $i_2 \cdot i_4$ and $i_3 \cdot i_4$ become available thanks to the combination of the free rotation of the large gear 35 relative to the output shaft and the planetary gear type reduction gear 36. More practically, assuming here that the reduction ratios $i_1$, $i_2$, $i_3$ and $i_4$ are 2.0, 2.5, 3.0 and 2.5, respectively, it is possible to obtain the reduction ratios of 2.0, 2.5, 3.0, 5.0, 6.25 and 7.5 with the same clutch case 10, 12.

The following advantages are offered by the reduction gear of the described embodiment.

(1) It is possible to obtain a wide range of reduction ratio of, for example, between about 2.0 and about 8.0 with the same clutch case for the small reduction ratio as that used in the conventional reduction gear. In other words, it becomes possible to obtain a wide variety of reduction ratios ranging between small reduction ratio (3.0 or smaller) and large reduction ratio (3.5 to 8.0) making use of the same clutch case of small reduction ratio as that used in the conventional reduction gear. It is, therefore, possible to obtain a less-expensive, small-sized and compact reduction and reversing gear for marine propulsion systems, capable of providing a large reduction ratio.

(2) Since a large variety of reduction ratio can be attained making use of a common small clutch case, the aforementioned troublesome modification of the hull required in the installation of the engine is eliminated and the installation of the reduction and reversing gear on the stern portion of the hull is very much facilitated. In consequence, the length of the engine room is reduced and the effective area of the ship is increased correspondingly. Namely, if the required reduction ratio is small, the conventional reduction gear is used without the planetary gear type reduction gear. However, when a large reduction ratio is required, the planetary gear type reduction gear as shown in FIG. 2 is attached to the conventional reduction gear. It will be apparent to those skilled in the art that the same direction of rotation of the propeller is obtained irrespective of the reduction ratio, i.e. irrespective of whether the planetary gear type reduction gear is used or not.

FIGS. 4 and 5 in combination show a second embodiment of the invention. The description of parts of this second embodiment other than the planetary gear type reduction gear is omitted because these parts are materially identical to those of the first embodiment.

Referring to FIG. 4, a large gear 35 carried by the output shaft 19 has a cylindrical internally toothed gear 43 of a large diameter formed unitarily and coaxially therewith. This internally toothed gear 43 projects into the space 25 below the clutch housing 21 of the ahead unit 20. To the rear section 12 of the clutch case closer to the opened end of the internally toothed gear 43, an externally toothed small gear 44 is attached in alignment and coaxially with the internally toothed gear, by means of a plurality of bolts 45. An outwardly directed flange 46 is attached to the output shaft 19 between the large gear 35 and the externally toothed gear 44. Three support shafts 47, which are equi-spaced in the circumferential direction and extended in parallel with the output shaft 19, are provided on the flange 46. Each support shaft 47 carries a planet gear 48 which engages both of the internally toothed gear 43 and the externally toothed gear 44 to constitute a planetary gear type reduction gear 49 (See FIG. 5).

In operation, the input shaft 16 rotates counter-clockwise (direction of arrow L) as viewed from the stern of the hull (right side in the drawings). As the clutch of the ahead unit 20 is turned into the operating condition, the small gear 26 rotates in the same direction as the input shaft 16 and the large gear 35 rotates clockwise (direction of arrow R) as viewed from the stern of the hull. Since the internally toothed large gear 43 rotates also in the clockwise direction (direction of arrow R) together with the large gear 35, the planetary gears 48 revolve in the clockwise direction around the externally toothed gear 44 fixed to the clutch case 12, while making clockwise rotation around their own axes.

The revolution of the planet gears 48 is transmitted to the output shaft 19 through the support shafts 47 (See FIG. 4) and the flange 46, so that the output shaft 19 is rotated clockwise at a reduced speed of rotation.

Figure 7:
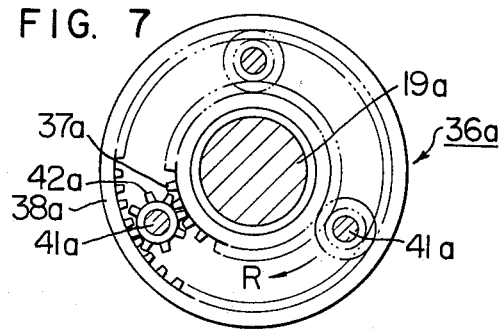
FIG. 7 is a sectional view of a planetary gear type reduction gear taken along the line VII—VII of FIG. 6.
Figure 6:
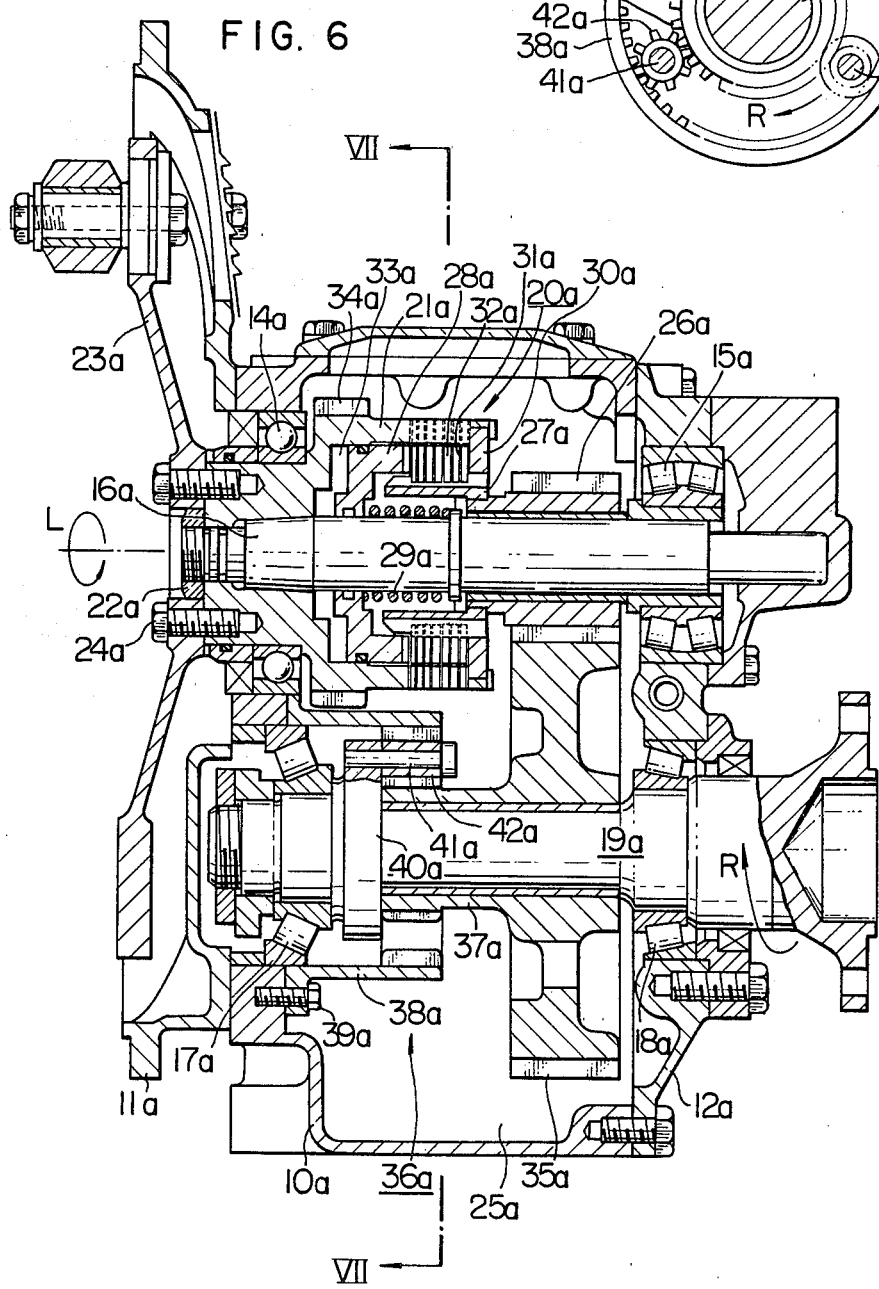
FIG. 6 is a sectional view of a third embodiment of the invention.

FIGS. 6 and 7 show a third embodiment of the invention which makes use of a reduction and reversing gear of small reduction ratio having a construction different from that used in the first and the second embodiments shown in FIGS. 2 through 5. More specifically, in this third embodiment, the positional relationship between the multiple disc clutch and the small gear on the input shaft is reverse to that in the first and the second embodiments. Accordingly, the arrangement of the large gear and the planetary gear type reduction gear on the output shaft is also reverse to that in the first and the second embodiments. The third embodiment is also different from the first and the second embodiments in some other respects than that specifically mentioned above.

The clutch case 10a of FIG. 6 is opened at its front and rear ends (left and right ends as viewed in the drawings). A front end cover 11a and a rear end cover 12a are attached to the opened ends of the clutch case 10a by means of a plurality of bolts so as to play also the role of the bearing supporting members. The clutch case 10a carries at its upper portion an input shaft 16a through the medium of bearings 14a and 15a. Also, an output shaft 19a is mounted below the input shaft 16a in parallel with the latter, through the medium of the bearings 17a, 18a.

A reference numeral 20a generally designates a commonly used ahead unit incorporating a wet type multiple disc clutch having a clutch housing 21a which is fitted to the input shaft 16a making use of a taper of the latter, and is fixed by means of a nut 22a.

A reference numeral 23a denotes an input flange fixed at its central portion to the boss of the clutch housing 21a by means of a plurality of bolts 24a. The input shaft 16a rotatably carries a small gear 26a which has a drum 27a unitary therewith. This drum 27a is disposed in the clutch housing 21a and is provided with a spline on its outer peripheral surface.

An annular piston 28a fitting to the inner surface of the clutch housing 21a and also to the surface of the input shaft 16a is resiliently biased to the left by the force of a compression spring 29a. A reference numeral 30a denotes a pressure disc which is fixed to the opened end of the clutch housing 21a, for example, by means of a snap ring. A plurality of discs 31a and a plurality of friction discs 32a are disposed alternatingly between the piston 28a and the pressure disc 30a. Each of the discs 31a is provided with peripheral teeth or projections which engage the grooves formed in the inner peripheral surface of the clutch housing 21a. Thus, the discs 31a are allowed to move relatively to the clutch housing 21a in the axial direction, but are prevented from rotating relatively to the latter. Also, the friction discs 32a have inner peripheral splines which engage the spline of the drum 27a to freely slide only in the axial direction.

Therefore, as the hydraulic pressure is introduced into the pressure chamber 33a behind the piston 28a, the discs 31a are brought into pressure contact with the friction discs 32a so that the clutch becomes operative to connect the small gear 26a to the housing 21a. The described small gear and multiple disc clutch in combination constitute the ahead element 20a.

A reference numeral 34a denotes a gear which is provided on the periphery of the housing 21a and meshing with a corresponding gear formed on the outer periphery of the clutch housing of an astern unit (not shown in FIG. 6 but also to be more fully described hereinafter in connection with FIGS. 10 and 11) which is disposed in parallel with the ahead unit 20a. The astern unit has a small gear corresponding to the small gear 26a of the ahead unit and meshing with the large gear 35a together with the small gear 26a.

The large gear 35a carried by the output shaft 19a has an externally toothed gear 37a of a small diameter formed unitarily and coaxially therewith. This externally toothed gear 37a is projected into the space 25a below the clutch housing 21a of the ahead unit 20a.

To the clutch case 10a close to the opened end of the externally toothed gear 37a (left end as viewed in the drawing), attached by means of a plurality of bolts 39a is an internally toothed gear 38a of a large diameter which is in alignment and coaxial with the externally toothed gear 37a. An outwardly directed flange 40a is provided on the output shaft 19a. The flange 40a has three support shafts 41a which are extended in parallel with the output shaft 19a and equi-spaced in the circumferential direction to project into the space between the externally toothed gear 37a and the internally toothed gear 38a. Each support shaft 41a supports a planet gear 42a which engages both the externally toothed gear 37a and the internally toothed gear 38a, thereby to constitute a planetary gear type reduction gear generally designated by a reference numeral 36a. (See FIG. 7)

During the operation of the engine, the input shaft 16a rotates counter-clockwise (in the direction of arrow L) as viewed from the stern side (right side in the drawing). As the clutch of the ahead unit 20a is turned into operative condition, the small gear 26a rotates in the same direction as the input shaft, so that the large gear 35a rotates clockwise (in the direction of arrow R) as viewed from the stern side. The externally toothed small gear 37a is also rotated clockwise (in the direction of arrow R) as shown in FIG. 7, together with the large gear 35a. Therefore, the planet gears 42a revolve clockwise along the internally toothed large gear 38a fixed to the clutch case 10a, while making counterclockwise rotation around their own axes. The revolution of the planet gears 42a is transmitted to the output shaft 19a through the support shafts 41a (FIG. 6) and then through the flange 40a, so that the output shaft 19a is rotated in the clockwise direction at a reduced speed of rotation.

FIGS. 8 and 9 show a fourth embodiment of the invention making use of the same reduction and reversing gear for small reduction ratio as that used in the third embodiment. Other parts of this fourth embodiment than the planetary gear type reduction gear are not described here because these parts are materially identical to those of the third embodiment.

Referring to FIG. 8, a large gear 35a carried by the output shaft 19a has an internally toothed large gear 43a formed coaxially and unitarily therewith. This internally toothed gear 43a is projected into the space 25a below the clutch housing 21a of the ahead unit 20a. Attached to the clutch case section 10a closer to the opened end (left side in the drawings) of the internally toothed gear 43a, by means of bolts 45a, is an externally toothed small gear 44a in alignment and coaxially with the internally toothed gear 43a. An outwardly directed flange 46a is attached to the output shaft 19a between the large gear 35a and the externally toothed gear 44a. Three support shafts 47a, which are equi-spaced in the circumferential direction and extended in parallel with the output shaft 19a, are attached to the flange 46a. Each support shaft 47a carries a planet gear 48a meshing with the internally toothed gear 43a and the externally toothed gear 44a thereby to constitute a planetary gear type reduction gear generally designated by a numeral 49a (See FIG. 9).

The astern unit for this fourth embodiment of the invention and its relationship to the remainder of the gearing system of FIGS. 8 and 9 are shown in FIGS. 10 and 11, where, since the astern unit is essentially identical to the ahead unit, elements of the former comparable to those of the latter are, for the sake of clarity, identified by like reference numerals but modified by the suffix "b". More particularly, the astern unit 20b is enclosed in its own casing that is closed both at its front and rear ends and houses a shaft 16b parallel to the input shaft 16a and journalled in bearings 14b and 15b. Surrounding the front end region of the shaft 16b is a clutch housing 21b which carries an astern gear 34b on its outer periphery, and a small gear 26b having a drum 27b unitary therewith and extending into the clutch housing 21b is rotatably carried by the shaft. An annular piston 28b is slidably fitted into the interior of the clutch housing 21b and onto the shaft 16b and is biased to the left by a compression spring 29b, and a pressure disc 30b closes the open end of the clutch housing. Interposed between the piston 28b and the pressure disc 30b are two sets of alternatingly interleaved friction discs 31b and 32b, one set being nonrotatably but axially movably connected with the clutch housing 21b and the other set being similarly connected with the drum 27b. The astern gear 34b is in meshing engagement with the ahead gear 34a on the clutch housing of the ahead unit 20a, and the small gear 26b of the astern unit is in meshing engagement with the large drive gear 35a in the same manner as the small gear 26a of the ahead unit.

In operation, the input shaft 16a rotates counterclockwise (direction of arrow L) as viewed from the stern (right side in the drawings). As the clutch of the ahead unit 20a is turned into operative condition while the clutch of the astern unit remains disengaged, the small gear 26a starts to rotate in the same direction as the input shaft 16a, so that the large gear 35a rotates in the clockwise direction (direction of arrow R) as viewed from the stern. Also, the internally toothed large gear 43a is rotated in the clockwise direction (direction of arrow R) as shown in FIG. 9, together with the large gear 35a. As a result, the planet gears 48a revolve in the clockwise direction around the externally toothed gear 44a fixed to the clutch case 10a, while making clockwise rotation around their own axes. The revolution of the planet gears 48a is transmitted through the support shafts 47a (FIG. 8) and the flange 46a to the output shaft 19a to rotate the latter in the clockwise direction at a reduced speed of rotation.

During all this time, of course, the astern gear 34b rotates with the ahead gear 34a (albeit in the opposite sense), but this has no effect because the gear 26b rotates idly with the large gear 35a and independently of the gear 34b.

On the other hand, when the clutch of the ahead unit is disengaged and the clutch of the astern unit is turned into operative condition, the rotation imparted to the astern gear 34b via the ahead gear 34a is transmitted to the small gear 26b and therethrough to the large gear 35a, which then rotates in a sense opposite to that denoted by the arrow R in FIGS. 8 and 9. The operation of the planetary gearing 43a/48a remains the same as before except for the sense of its rotation. At this time, of course, the small gear 26a rotates idly with the large gear 35a and independently of the ahead gear 34a, so that the operation of the latter is not directly transmitted to the large gear.

From the foregoing description, it will be apparent that the astern unit for the embodiment of the invention shown in FIGS. 6–7 is identical in all respects of construction, arrangement of parts and operation to the astern unit shown in FIGS. 10–11 for the fourth embodiment. Correspondingly, the astern unit for the first and second embodiments of the invention shown in FIGS. 2–3 and FIGS. 4–5 is also essentially identical in construction and operation to that so far described for the third and fourth embodiments, except that in the astern unit for the earlier embodiments the arrangement of the astern unit parts will be the reverse of that shown in FIGS. 10 and 11.

It will also be apparent to those skilled in the art that the advantages brought about by the first embodiment can equally be achieved by the second, third and fourth embodiments of the invention.

In each moreover, the astern unit may be dispensed with if the reduction gear is used in combination with a controllable pitch propeller.

What is claimed is:

1. A reduction and reversing gear for marine propulsion systems, the reduction and reversing gear having: a clutch case, an input shaft mounted on an upper portion of said clutch case, an output shaft mounted at a lower portion of said clutch case and extending in parallel with said input shaft, an ahead unit including a multiple disc clutch mounted on said input shaft and having a clutch housing adapted to rotate unitarily with said input shaft and a small gear mounted on said input shaft and adjacent to said multiple disc clutch, said small gear being adapted to be connected to and disconnected from said input shaft in accordance with the state of said multiple disc clutch, a large gear mounted on said output shaft for engagement with said small gear, and an astern unit disposed in parallel with said ahead unit and including a multiple disc clutch having a clutch housing operatively connected to said clutch housing of said ahead unit and a small gear for engagement with said large gear; wherein the improvement comprises a planetary gear type reduction gear disposed in the space below said multiple disc clutch of said ahead unit, the planetary gear type reduction gear being connected at its one side to said large gear and to said output shaft at its other side, whereby it becomes possible to provide a reduction and reversing gear of a large variety of reduction ratios by making use of a common clutch case for small reduction ratios.

2. A reduction and reversing gear for marine propulsion systems as claimed in claim 1, wherein said planetary gear type reduction gear includes: an externally toothed small gear coaxial and integral with said large gear; an internally toothed large gear fixed to said clutch case and disposed in alignment and coaxially with said externally toothed gear; a flange provided on said output shaft; a plurality of support shafts carried by said flange and extending into the space between said externally toothed gear and said internally toothed gear; and a plurality of planet gears supported by respective support shafts and engaging with said externally toothed gear and said internally toothed gear.

3. A reduction and reversing gear for marine propulsion systems as claimed in claim 1, wherein said planetary gear type reduction gear includes: an internally toothed large gear coaxial and unitary with said large gear; an externally toothed small gear fixed to said clutch case and disposed in alignment and coaxially with said internally toothed gear; a flange provided on said output shaft; a plurality of support shafts carried by said flange and extending into the space between said internally toothed gear and said externally toothed gear; and a plurality of planet gears supported by respective support shafts and engaging with said externally toothed gear and said internally toothed gear.

4. A reduction and reversing gear for marine propulsion systems as claimed in claim 2 or 3, wherein said small gear on said input shaft and said large gear on said output shaft are disposed at the output side of the space in said clutch case, while said multiple disc clutch on said input shaft and said planetary gear type reduction gear coaxial with said output shaft are disposed at the output side of the space in said clutch case.

5. A reduction and reversing gear for marine propulsion systems as claimed in claim 2 or 3, wherein said multiple disc clutch on said input shaft and said planetary gear type reduction gear coaxial with said output shaft are disposed at the input side of the space in said clutch case, while said small gear on said input shaft and said large gear on said output shaft are disposed at the output side of the space in said clutch case.

* * * * *